UNITED STATES PATENT OFFICE.

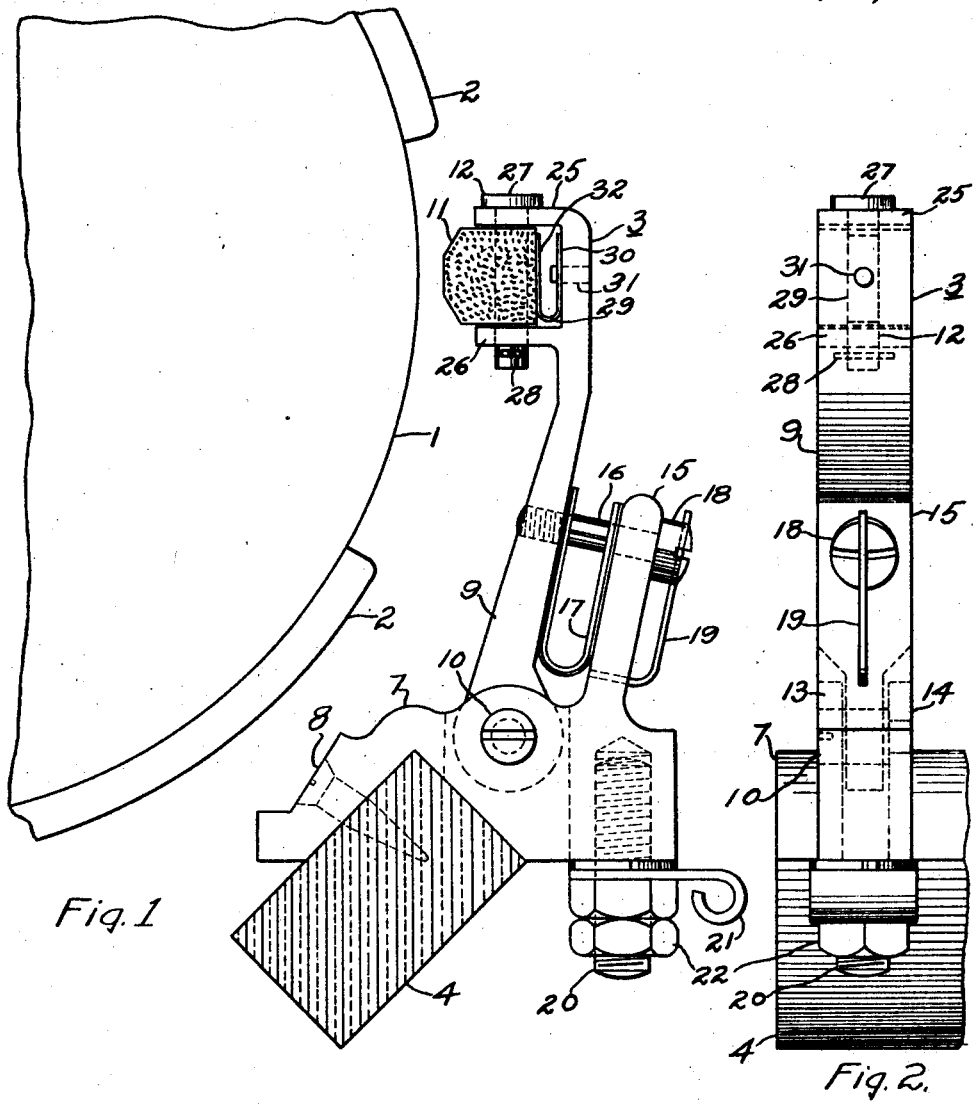

SAMUEL R. DODDS, OF WILKINSBURG, PENNSYLVANIA, ASSIGNOR TO WESTING-HOUSE ELECTRIC AND MANUFACTURING COMPANY, A CORPORATION OF PENNSYLVANIA.

CONTROL APPARATUS.

1,384,452.     Specification of Letters Patent.     Patented July 12, 1921.

Application filed January 10, 1917. Serial No. 141,725.

*To all whom it may concern:*

Be it known that I, SAMUEL R. DODDS, a citizen of the United States, and a resident of Wilkinsburg, in the county of Allegheny and State of Pennsylvania, have invented a new and useful Improvement in Control Apparatus, of which the following is a specification.

My invention relates to control apparatus and especially to control fingers that are adapted for engagement with controllers of the drum type and the like.

The object of my invention is to provide a relatively simple and compact device of the above-indicated character for effectively and reliably producing a resilient contact pressure upon the segments of a control drum, whereby suitable allowances for unavoidable variations in the dimensions of manufactured parts and slight inaccuracies in assembly are compensated for, while maintaining, at all times, a desirable contact pressure between the current-carrying parts.

More specifically stated, it is the object of my invention to provide a self-alining or self-adjusting control finger having independent yielding or resilient mechanical connections between the finger shank or body member and the stationary supporting member and also between the shank and the contact tip.

My invention may best be understood by reference to the accompanying drawing, wherein Figure 1 is a plan view of a control drum, and of a control finger constructed in accordance with my present invention; and Fig. 2 is a view, in front elevation, of the control finger that is shown in Fig. 1.

Referring to the drawing, the apparatus shown comprises a rotatable control drum 1 of any well-known type, which carries a plurality of contact segments 2 that are adapted to be engaged by any suitable number of my control fingers 3, which are mounted upon a stationary finger-base or block 4 of insulating material, in accordance with the customary practice.

The control finger 3 comprises a supporting member or base 7 of conducting material that is rigidly mounted upon the finger-block 4 by means of suitable screws 8, or the like; a body member or shank 9 that is pivotally mounted at 10 upon the supporting member 7; and a contact tip 11 that is pivotally mounted upon the shank 9 through the agency of a pin or pivot 12.

The inner end of the shank 9 is located in an aperture or chamber of the supporting member 7 that is provided with side walls 13 and 14, the pivot or pin 10 extending through the side walls 13 and 14 and the intermediately-located end portion of the shank 9, whereby a free rotative movement of the shank 9, with respect to the supporting member 7, is permitted for purposes of initial adjustment of position.

The supporting member 7 is also provided with an outwardly-extending ear or lug 15 through the free end of which a bolt 16 extends, said bolt being threaded into the shank 9.

A looped or U-shaped spring member 17 has both its arms mounted upon the bolt 16 to respectively bear against the lug 15 and the shank 9. The head 18 of the bolt 16 is provided with a plurality of transverse slots, and a bent wire or similar member 19, having one end rigidly secured to the inner end of the lug 15, is positioned in one of the slots in the bolt-head 18 for the purpose of locking the bolt in the desired position. Thus, the shank 9 is resiliently associated with the supporting member 7 within the limits of movement of the threads of the bolt 16.

For the purpose of providing a suitable electrical connection to an external circuit, a headless bolt 20 is secured to the supporting member 7, and a terminal member 21, of a familiar type, is mounted upon the bolt 20 and is rigidly attached to the supporting member 7 through the agency of a plurality of nuts 22.

The outer or free end of the shank 9 terminates in two substantially parallel arms 25 and 26 that extend approximately at right angles to the adjacent portion of the shank. The pivot or pin 12 extends through suitable openings in the arms 25 and 26, which openings are preferably somewhat larger than the diameter of the pin 12 to permit a certain freedom of movement or play thereof, and the pin also extends through an aperture in the contact tip 11, which is thus pivotally mounted, with respect to the shank 9, within the arms 25 and 26 thereof. One end of the pin or pivot 12 is provided with a positioning head or enlargement 27, while the other end thereof may be supplied with a cotter-pin 28, or the like, whereby the contact tip 11 may be readily and quickly removed and renewed.

A second U-shaped flat spring member 29 is located behind the contact tip 11 to bear thereupon in a transverse direction to the pivotal axis of the pin 12. One arm 30 of the U-shaped member 29 has an aperture fitting over a pin 31 that is fixed in the shank 9, while the other or free arm 32 bears directly against the contact tip 11. Thus, the spring member 29 is free to exert resilient pressure upon the contact tip and bias it to the outermost position that is permitted by the relative sizes of the pin 12 and the corresponding openings in the shank arms 25 and 26, while, at the same time, the spring member may be readily assembled or renewed.

I have thus provided a relatively simple and compact self-adjusting control finger, the shank therefor having a resilient mechanical connection with both the supporting or base member 7 and the contact tip 11 in order to meet the previously-described manufacturing or operating conditions.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. A control finger having a shank terminating in two arms extending at substantially right angles thereto, a one-piece contact tip removably and pivotally mounted within said arms, and a U-shaped spring member extending substantially parallel to the pivotal axis and having one arm detachably secured to said shank and having its other arm bearing upon said contact tip.

2. A control finger having a stationary supporting member, a shank pivotally mounted thereon, resilient means acting between said member and said shank, a one-piece contact tip rotatively mounted upon the shank, and resilient means acting upon the tip transversely to the axis of rotation.

3. A control finger having a stationary supporting member, a shank pivotally mounted thereon and terminating in two spaced arms, a one-piece contact tip pivotally mounted within said arms, resilient means located intermediate said arms and bearing upon said tip, and other resilient means acting between said supporting member and said shank.

4. A control finger having a stationary supporting member, a shank pivotally mounted thereon and terminating in two spaced arms, a one-piece contact tip pivotally mounted within said arms, a U-shaped spring member having one arm secured to said shank and having its other arm bearing upon said contact tip, and a second U-shaped spring member having its arms respectively bearing against said shank and said supporting member.

In testimony whereof, I have hereunto subscribed my name this 27th day of Dec. 1916.

SAMUEL R. DODDS.